United States Patent
Kaneko et al.

(10) Patent No.: US 10,629,228 B2
(45) Date of Patent: Apr. 21, 2020

(54) MAGNETIC TAPE CARTRIDGE, MANUFACTURING METHOD OF MAGNETIC TAPE CARTRIDGE, MANUFACTURING DEVICE OF MAGNETIC TAPE CARTRIDGE, RECORDING AND REPRODUCING APPARATUS, AND CONTROL METHOD

(71) Applicant: FUJIFILM CORPORATION, Minato-ku, Tokyo (JP)

(72) Inventors: Tetsuya Kaneko, Kanagawa (JP); Yusuke Kagawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/414,762

(22) Filed: May 16, 2019

(65) Prior Publication Data

US 2019/0362743 A1 Nov. 28, 2019

(30) Foreign Application Priority Data

May 28, 2018 (JP) .................. 2018-101757

(51) Int. Cl.
  *G11B 15/43* (2006.01)
  *G11B 5/008* (2006.01)
  *G11B 5/78* (2006.01)

(52) U.S. Cl.
  CPC ............ *G11B 5/00813* (2013.01); *G11B 5/78* (2013.01)

(58) Field of Classification Search
  CPC ..... G11B 15/43; G11B 15/48; G11B 2220/90; G11B 5/008; G11B 5/00813; G11B 5/02; G11B 15/093; G11B 15/54; G11B 20/1201; G11B 2020/1265; G11B 5/584; G11B 2020/1281; G11B 2020/1287
  USPC .................... 360/48, 49, 72.2, 74.3
  See application file for complete search history.

(56) References Cited

U.S. PATENT DOCUMENTS

| | | | |
|---|---|---|---|
| 8,139,312 B2 * | 3/2012 | Bui ......................... | G11B 5/584 360/77.12 |
| 9,997,184 B1 * | 6/2018 | Bui ...................... | G11B 5/5926 |
| 2005/0231845 A1 * | 10/2005 | Shirouzu ................ | G11B 15/07 360/48 |

FOREIGN PATENT DOCUMENTS

| JP | 2005-327392 A | 11/2005 |
|---|---|---|
| JP | 2008-542969 A | 11/2008 |

* cited by examiner

*Primary Examiner* — Nabil Z Hindi
(74) *Attorney, Agent, or Firm* — Solaris Intellectual Property Group, PLLC

(57) ABSTRACT

A magnetic tape cartridge includes: a magnetic tape including plural servo bands on which servo patterns are recorded, and a data band that is provided between the servo bands and on which data is recorded; and a recording medium on which servo band interval relevant information is recorded, the servo band interval relevant information including an interval of adjacent servo recording elements of plural servo recording elements in a direction corresponding to a width direction of the magnetic tape, each of the plural servo recording elements records the servo pattern on each of the plural servo bands.

10 Claims, 10 Drawing Sheets

FIG. 8A

| SERVO BAND | SERVO POSITION | DISTANCE D [μm] |
|---|---|---|
| 0 | 0 | 21.389 |
|  | 1 | 22.613 |
|  | 2 | 23.837 |
|  | 3 | 25.062 |
|  | 4 | 26.286 |
|  | ... | ... |
| 1 | ... | ... |
| ... | ... | ... |

FIG. 8B

| SERVO BAND | SERVO POSITION | DISTANCE D [μm] | DISTANCE IN WIDTH DIRECTION [μm] |
|---|---|---|---|
| 0 | 0 | 21.389 | 39.074 |
|  | 1 | 22.613 | 36.195 |
|  | 2 | 23.837 | 33.316 |
|  | 3 | 25.062 | 30.434 |
|  | 4 | 26.286 | 27.555 |
|  | ... | ... | ... |
|  |  | 54.611 | −39.074 |
| 1 | ... | ... | ... |
| ... | ... | ... | ... |

| DATA BAND | LAPPING POSITION | INTERVAL K1 [μm] |
|---|---|---|
| 0 | 0 | 2858.7 |
|  | 1 | 2858.7 |
|  | 2 | 2858.7 |
|  | ... | ... |
| 1 | ... | ... |
| ... | ... | ... |

| DATA BAND | LAPPING POSITION | INTERVAL K1 [μm] | INTERVAL h1 [μm] | INTERVAL K2 [μm] | TENSION [N] |
|---|---|---|---|---|---|
| 0 | 0 | 2858.7 | 2858.8 | 2858.92 | 0.60 |
|   | 1 | 2858.7 | 2858.8 | 2858.95 | 0.62 |
|   | 2 | 2858.7 | 2858.8 | 2858.87 | 0.58 |
|   | ... | ... | ... | ... | ... |
| 1 | ... | ... | ... | ... | ... |
| ... | ... | ... | ... | ... | ... |

16

IDEAL SERVO
PATTERN

ACTUAL SERVO
PATTERN

SP1 SP2
SP

SP1 SP2
SP

MAGNETIC TAPE CARTRIDGE, MANUFACTURING METHOD OF MAGNETIC TAPE CARTRIDGE, MANUFACTURING DEVICE OF MAGNETIC TAPE CARTRIDGE, RECORDING AND REPRODUCING APPARATUS, AND CONTROL METHOD

CROSS-REFERENCE TO RELATED APPLICATION

This application claims priority from Japanese Patent Application No. 2018-101757, filed on May 28, 2018, the disclosure of which is incorporated by reference herein in its entirety.

BACKGROUND

Field of the Invention

The present disclosure relates a magnetic tape cartridge, a manufacturing method of a magnetic tape cartridge, a manufacturing device of a magnetic tape cartridge, a recording and reproducing apparatus, and a control method.

Related Art

In related art, a servo pattern is written on a magnetic tape, in order to cause a recording and reproducing element of a magnetic head to follow a data track of the magnetic tape on which magnetic information is recorded. As this writing system of the servo pattern on the magnetic tape, a timing-based system is known.

As a technology regarding this timing-based system, JP2005-327392A discloses a technology of writing conditions during the recording obtained by reading a servo pattern by a servo reproducing element during the recording of data on a data track, on the data track.

JP2008-542969A discloses a magnetic tape comprising a data track which is present between two servo bands and in which a distance between the two servo bands is shorter than 200 µm.

However, in recent years, realization of high-density of a magnetic tape has proceeded, and accordingly, a width of a data track and intervals between the data tracks become extremely narrow. In the future, it is expected that realization of the high density of the magnetic tape further proceeds, and therefore, a higher accuracy is required for positioning of a magnetic head of the magnetic tape in the width direction.

Meanwhile, a servo recording head comprising a plurality of servo recording elements which are provided to correspond to a plurality of servo bands in a one-to-one manner and record servo patterns, respectively, may be individually different due to errors or the like in a manufacturing process. In this case, in a case where positioning of a magnetic head is performed based on the servo pattern recorded on the servo band without considering this individual difference, the positioning of the magnetic head may not be performed with an excellent accuracy. However, in the technologies disclosed in JP2005-327392A and JP2008-542969A, these problems are not considered.

SUMMARY

This disclosure is made in consideration of these circumstances and a object thereof is to provide a magnetic tape cartridge capable of performing positioning of a magnetic head with an excellent accuracy, a manufacturing method of a magnetic tape cartridge, a manufacturing device of a magnetic tape cartridge, a recording and reproducing apparatus, and a control method.

In order to achieve the aforementioned object, there is provided a magnetic tape cartridge of the disclosure comprising: a magnetic tape including a plurality of servo bands, on which servo patterns are recorded, and a data band which is provided between the servo bands and on which data is recorded; and a recording medium on which servo band interval relevant information including an interval of adjacent servo recording elements of a plurality of servo recording elements, each of which records the servo pattern on each of the plurality of servo bands, in a direction corresponding to a width direction of the magnetic tape, is recorded.

In the magnetic tape cartridge of the present disclosure, the servo band interval relevant information may further include a tension of the magnetic tape, in a case of recording data on the data band, an interval of servo reproducing elements of a tape drive which reproduce the adjacent servo patterns in a direction corresponding to the width direction, in a case of recording the data on the data band, and an interval between the adjacent servo bands in the width direction detected, in a case of recording the data on the data band.

In the magnetic tape cartridge of the present disclosure, the servo band interval relevant information may be recorded on the recording medium on each of a plurality of different positions of the servo pattern along the width direction.

In order to achieve the aforementioned object, there is provided a manufacturing method of a magnetic tape cartridge of the disclosure including a magnetic tape including a plurality of servo bands, on which servo patterns are recorded, and a data band which is provided between the servo bands and on which data is recorded, and a recording medium, the method comprising: recording servo band interval relevant information including an interval of adjacent servo recording elements of a plurality of servo recording elements, each of which records the servo pattern on each of the plurality of servo bands, in a direction corresponding to a width direction of the magnetic tape, on the recording medium.

In order to achieve the aforementioned object, there is provided a manufacturing device of a magnetic tape cartridge of the disclosure including a magnetic tape including a plurality of servo bands, on which servo patterns are recorded, and a data band which is provided between the servo bands and on which data is recorded, and a recording medium, the device comprising: a recording unit which records servo band interval relevant information including an interval of adjacent servo recording elements of a plurality of servo recording elements, each of which records the servo pattern on each of the plurality of servo bands, in a direction corresponding to a width direction of the magnetic tape, on the recording medium.

In order to achieve the aforementioned object, there is provided a recording and reproducing apparatus of the disclosure comprising: a magnetic head which includes a servo reproducing element which reads a servo pattern recorded on a servo band of a magnetic tape cartridge including a magnetic tape including a plurality of servo bands, on which servo patterns are recorded, and a data band which is provided between the servo bands and on which data is recorded, and a recording medium on which servo band interval relevant information including an interval of adjacent servo recording elements of a plurality of servo recording elements, each of which records the servo pattern on each of the plurality of servo bands, in a direction corresponding to a width direction of the magnetic tape, is recorded, and a recording and reproducing element which performs recording and reproducing of data with respect to the data band; a detection unit which detects the interval of the adjacent servo bands in the width direction from a read result of the servo pattern by the servo reproducing element; a deriving unit which derives a tension of the magnetic tape in accordance with a difference between an interval of the servo recording elements in a direction corresponding to the width direction of the magnetic tape included in the servo band interval relevant information and the interval detected by the detection unit; and a control unit which controls the tension of the magnetic tape to be the tension derived by the deriving unit, in a case of recording data on the data band by the recording and reproducing element.

In the recording and reproducing apparatus of the present disclosure, the control unit may perform a control of recording the servo band interval relevant information on the recording medium by adding the tension derived by the deriving unit, the interval of the adjacent servo reproducing elements in the direction corresponding to the width direction, and the interval detected by the detection unit to the servo band interval relevant information.

In order to achieve the aforementioned object, there is provided a recording and reproducing apparatus of the disclosure comprising: a magnetic head which includes a servo reproducing element which reads a servo pattern recorded on a servo band of a magnetic tape cartridge including a magnetic tape including a plurality of servo bands, on which servo patterns are recorded, and a data band which is provided between the servo bands and on which data is recorded, and a recording medium, on which servo band interval relevant information including an interval of adjacent servo bands in a width direction of the magnetic tape, detected in a case of recording data on the data band, a tension of the magnetic tape in a case of recording data on the data band, and an interval of the adjacent servo reproducing elements in a direction corresponding to the width direction, is recorded, and a recording and reproducing element which performs recording and reproducing of data with respect to the data band; a detection unit which detects the interval of the adjacent servo bands in the width direction from a read result of the servo pattern by the servo reproducing element; a deriving unit which derives a tension of the magnetic tape for minimizing a difference between a deviation amount from an ideal value of an interval of the servo bands in the width direction obtained from the interval between the adjacent servo bands in the width direction, the tension, and the interval between the adjacent servo reproducing elements in a direction corresponding to the width direction included in the servo band interval relevant information, and a deviation amount obtained from the interval detected by the detection unit, the interval between the adjacent servo reproducing elements in a direction corresponding to the width direction included in the magnetic head, and the tension of the magnetic tape in a case of reproducing data recorded on the data band by the recording and reproducing element; and a control unit which controls the tension of the magnetic tape to be the tension derived by the deriving unit, in a case of reproducing data recorded on the data band by the recording and reproducing element.

In order to achieve the aforementioned object, there is provided a control method of a tension of a magnetic tape performed by a recording and reproducing apparatus including a magnetic head including a servo reproducing element which reads a servo pattern recorded on a servo band of a magnetic tape cartridge including a magnetic tape including a plurality of servo bands, on which servo patterns are recorded, and a data band which is provided between the servo bands and on which data is recorded, and a recording medium on which servo band interval relevant information including an interval of adjacent servo recording elements of a plurality of servo recording elements, each of which records the servo pattern on each of the plurality of servo bands, in a direction corresponding to a width direction of the magnetic tape, is recorded, and a recording and reproducing element which performs recording and reproducing of data with respect to the data band, the method of the disclosure comprising: detecting an interval between the adjacent servo bands in the width direction from a read result of the servo pattern by the servo reproducing element; deriving a tension of the magnetic tape in accordance with a difference between an interval of the servo recording elements in a direction corresponding to the width direction of the magnetic tape included in the servo band interval relevant information and the detected interval; and controlling the tension of the magnetic tape to be the derived tension, in a case of recording data on the data band by the recording and reproducing element.

In order to achieve the aforementioned object, there is provided a control method of a tension of a magnetic tape performed by a recording and reproducing apparatus including a magnetic head including a servo reproducing element which reads a servo pattern recorded on a servo band of a magnetic tape cartridge including a magnetic tape including a plurality of servo bands, on which servo patterns are recorded, and a data band which is provided between the servo bands and on which data is recorded, and a recording medium, on which servo band interval relevant information including an interval of adjacent servo bands in a width direction of the magnetic tape, detected in a case of recording data on the data band, a tension of the magnetic tape in a case of recording data on the data band, and an interval of the adjacent servo reproducing elements in a direction corresponding to the width direction, is recorded, and a recording and reproducing element which performs recording and reproducing of data with respect to the data band; detecting the interval of the adjacent servo bands in the width direction from a read result of the servo pattern by the servo reproducing element; deriving a tension of the magnetic tape for minimizing a difference between a deviation amount from an ideal value of an interval of the servo bands in the width direction obtained from the interval between the adjacent servo bands in the width direction, the tension, and the interval between the adjacent servo reproducing elements in a direction corresponding to the width direction included in the servo band interval relevant information, and a deviation amount obtained from the detected interval, the interval between the adjacent servo reproducing elements in a direction corresponding to the width direction included in the magnetic head, and the tension of the magnetic tape in a case of reproducing data recorded on the data band by the recording and reproducing element; and controlling the tension of the magnetic tape to be the derived tension, in a case of reproducing data recorded on the data band by the recording and reproducing element.

According to the present disclosure, it is possible to perform the positioning of the magnetic head with an excellent accuracy.

BRIEF DESCRIPTION OF THE DRAWINGS

FIG. 8A is a view showing an example of servo pattern distance information according to the embodiment.

FIG. 8B is a view showing an example of a servo position derived from the servo pattern distance information according to the embodiment.

DETAILED DESCRIPTION

Hereinafter, embodiments for implementing technologies of the disclosure will be described in detail with reference to the drawings.

Figure 1:
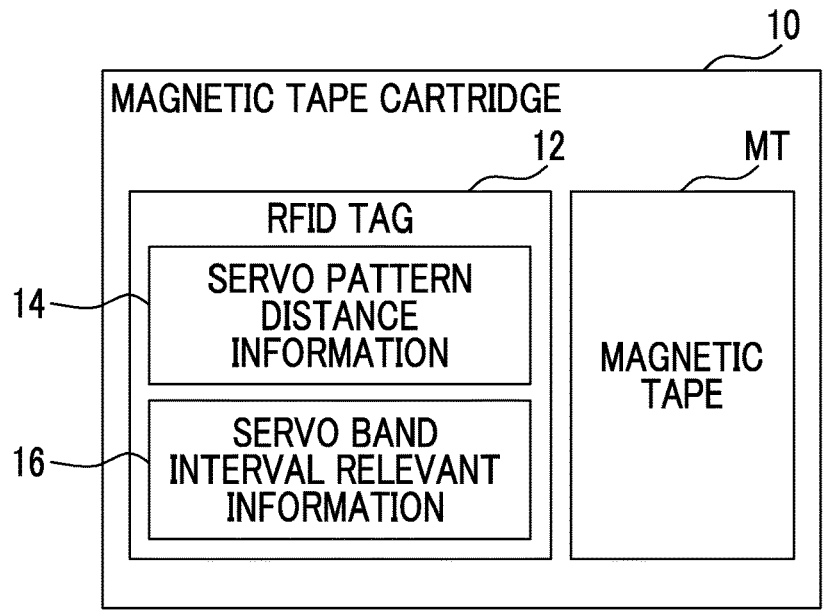
FIG. 1 is a block view showing an example of a configuration of a magnetic tape cartridge according to the embodiment.

First, a configuration of a magnetic tape cartridge 10 according to the embodiment will be described with reference to FIGS. 1 and 2. As shown in FIG. 1, a magnetic tape cartridge 10 comprises a magnetic tape MT on which information is magnetically recorded, and a radio frequency identifier (RFID) tag 12 as an example of a recording medium capable of reading the recorded information by wireless communication or the like in a contactless manner. On the RFID tag 12, a servo pattern distance information item 14 and a servo band interval relevant information item 16 are recorded. Details of the servo pattern distance information item 14 and the servo band interval relevant information 16 will be described later.

Figure 2:
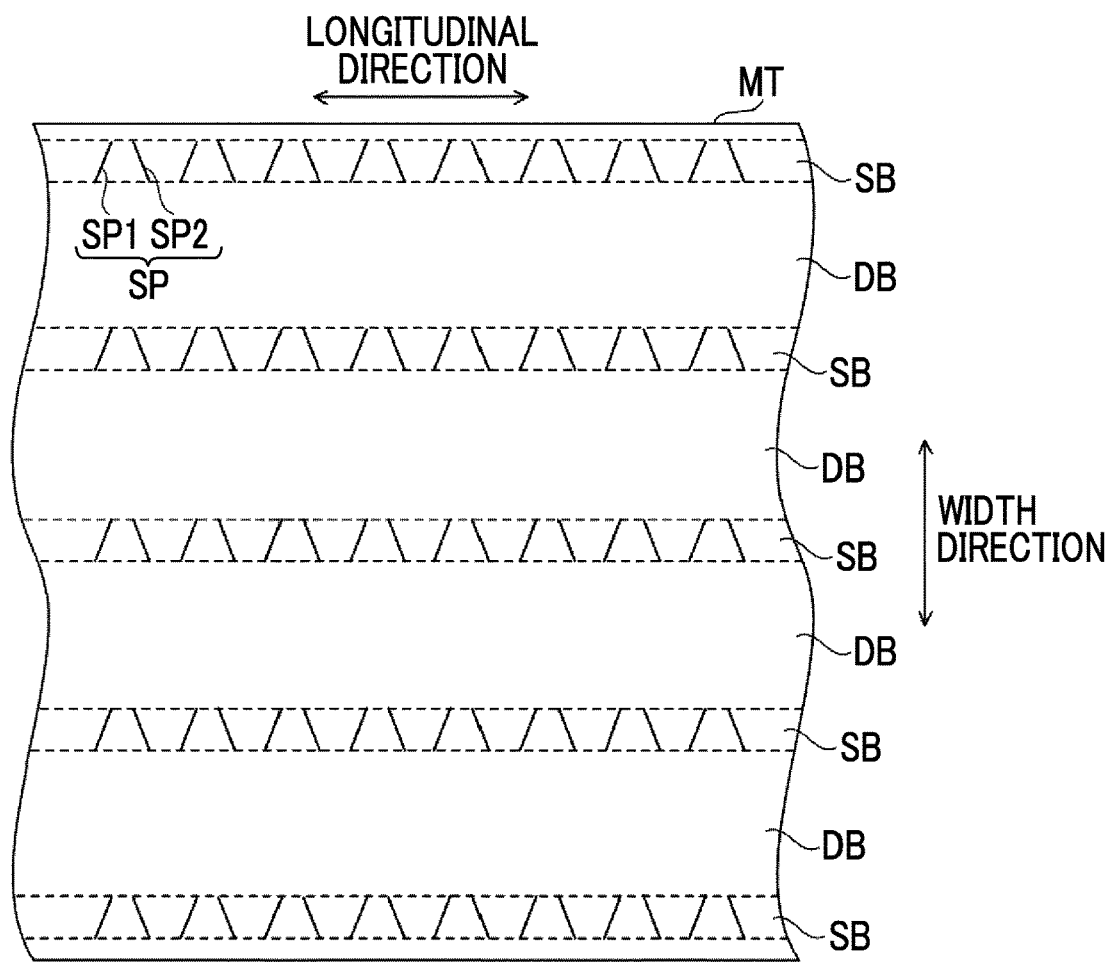
FIG. 2 is a plan view showing an example of a magnetic tape according to the embodiment.

As shown in FIG. 2, five servo bands SB are formed on the magnetic tape MT along a longitudinal direction of the magnetic tape MT. The five servo bands SB are formed so as to be arranged in a width direction (short direction) of the magnetic tape MT at regular intervals. A data band DB, on which data is recorded, is formed between each of the five servo bands SB. The number of the servo bands SB and the data bands DB is not limited to the example shown in FIG. 2. For example, the number of servo bands SB may be 3 and the number of data bands DB may be 2. Hereinafter, the longitudinal direction simply written means the longitudinal direction of the magnetic tape MT and the width direction simply written means the width direction of the magnetic tape MT.

On the servo band SB, servo patterns SP for performing positioning of a magnetic head H (see FIG. 3) in the width direction are repeatedly formed in the longitudinal direction of the servo band SB. The servo pattern SP includes a linear pattern SP1 and a linear pattern SP2 which are formed along a width direction of the servo band SB to be tilted with respect to the width direction of the servo band SB by a predetermined angle. The linear pattern SP2 is formed not to be parallel with the linear pattern SP1 along the width direction of the servo band SB. In the embodiment, the linear pattern SP2 is formed so as to be linearly symmetrical to the linear pattern SP1, with respect to the linear line along the width direction of the servo band SB. FIG. 2 shows an example in which the servo pattern SP includes one pair of the linear pattern SP1 and the linear pattern SP2, but the servo pattern SP may include the plurality of linear patterns SP1 and the linear patterns SP2.

Next, a process of positioning the magnetic head H with respect to the width direction of the magnetic tape MT on which the servo pattern SP is formed will be described with reference to FIGS. 3 and 4.

Figure 3:
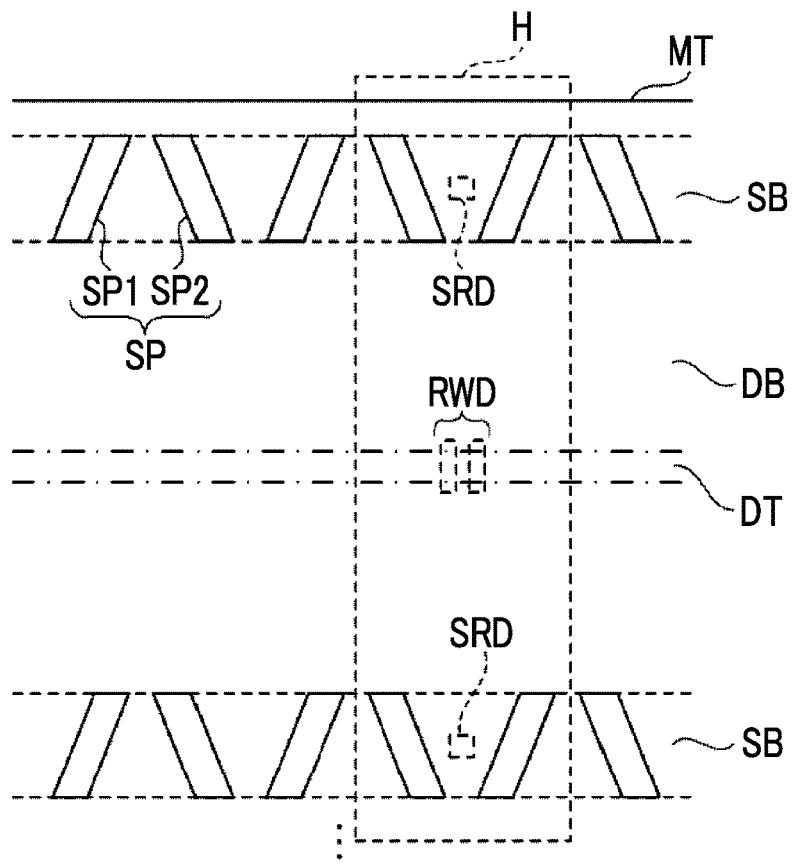
FIG. 3 is a plan view for describing a positioning process of a magnetic head according to the embodiment.

As shown in FIG. 3, the magnetic head H includes a servo reproducing element SRD which reads out and reproduces the servo pattern SP recorded on the servo band SB, and a recording and reproducing element RWD which performs recording and reproducing of data with respect to the data track DT. Hereinafter, the position of the magnetic head H, the position of the servo reproducing element SRD, and the position of the recording and reproducing element RWD, which are simply noted, respectively mean positions along the width direction of the magnetic tape MT.

In the embodiment, in a case where the magnetic tape MT runs in a predetermined running direction (for example, right to left direction in FIG. 3), the servo reproducing element SRD of the magnetic head H is positioned at a predetermined position of the servo band SB in a width direction, thereby positioning the magnetic head H with respect to the magnetic tape MT. Hereinafter, the running direction simply written means the running direction of the magnetic tape MT.

In a case where the linear pattern SP1 and the linear pattern SP2 pass through a detection position of the servo reproducing element SRD, the servo reproducing element SRD detects the linear pattern SP1 and the linear pattern SP2. In this case, the magnetic head H is positioned at a position so that a detection interval of the linear pattern SP1 and the linear pattern SP2 becomes a predetermined value. Accordingly, the recording and reproducing element RWD of the magnetic head H follows a predetermined data track DT.

Figure 4:
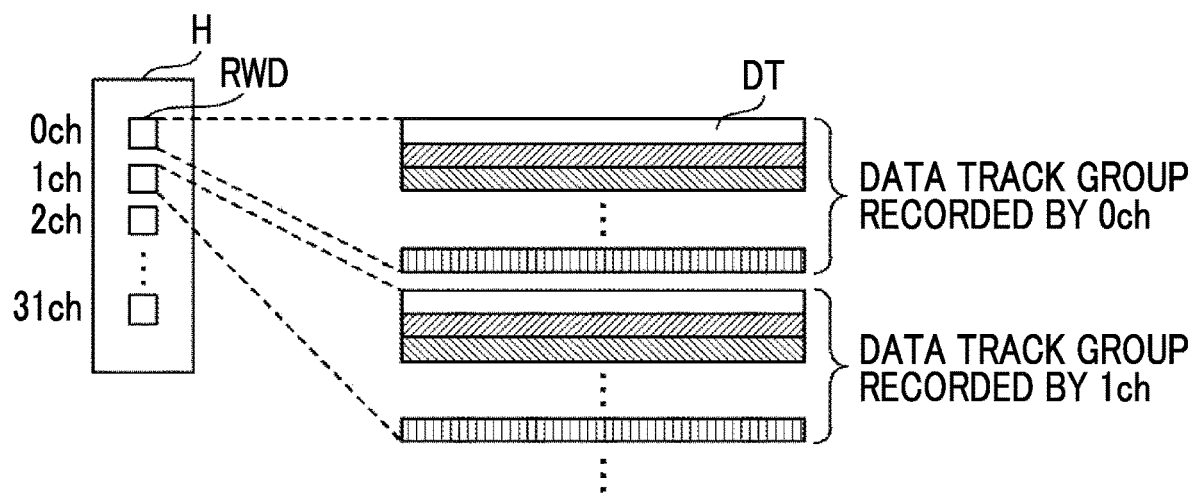
FIG. 4 is a view for describing a process of recording or reproducing of data performed by a recording and reproducing element according to the embodiment.

As shown in FIG. 4, the plurality (32 in the example of FIG. 4) of recording and reproducing elements RWD can be provided and can perform recording and reproducing of data at the same time on the plurality of data tracks DT. Hereinafter, a position of the magnetic head H during performing the recording or reproducing of data on the predetermined data track DT is referred to as a "lapping position".

Next, a configuration of a servo writer SW which records the servo pattern SP on each servo band SB of the magnetic tape MT according to the embodiment will be described with reference to FIGS. 5A and 5B.

Figure 5A:
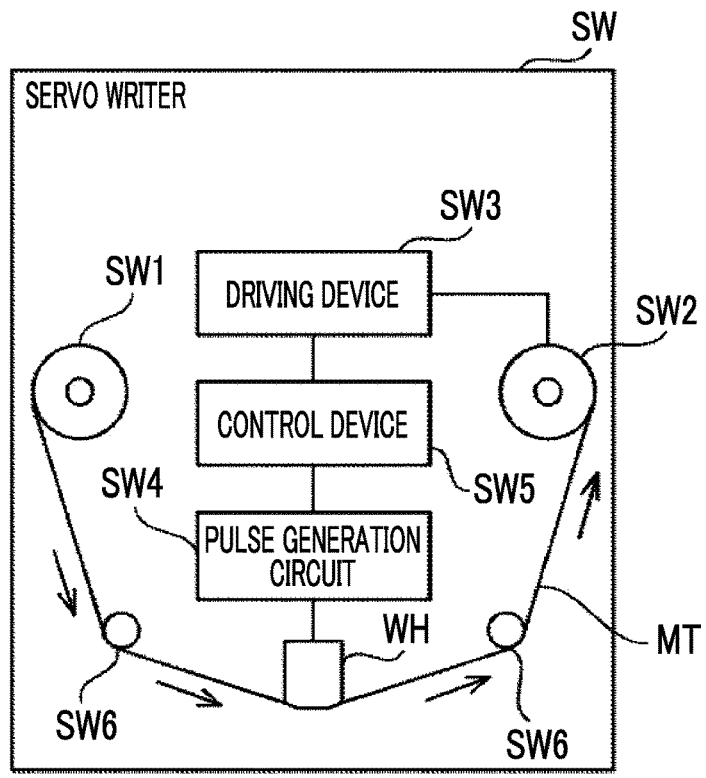
FIG. 5A is a view showing an example of a configuration of a servo writer according to the embodiment.

As shown in FIG. 5A, the servo writer SW comprises a sending reel SW1, a winding reel SW2, a driving device SW3, a pulse generation circuit SW4, a control device SW5, and a servo signal writing head WH. In addition, the servo writer SW also comprises a power device, a cleaning device which cleans the magnetic tape MT, a verifying device which performs inspection of the servo pattern SP recorded on the magnetic tape MT, and the like which are not shown.

In the sending reel SW1, the magnetic tape MT cut to have a product width from a raw web having a wide width, before writing the servo pattern SP is set on a pancake reel having a great diameter, and the magnetic tape MT is sent at the time of writing the servo pattern SP. The magnetic tape MT sent from the sending reel SW1 is guided to a guide SW6 and the like and transported to the servo signal writing head WH. The magnetic tape MT in which the servo pattern SP is recorded on each servo band SB with the servo signal writing head WH is guided to the guide SW6 and the like and transported to the winding reel SW2. The winding reel SW2 is rotatably driven by a driving device SW3, and the magnetic tape MT on which the servo pattern SP is recorded is wound up.

The driving device SW3 is a device for rotatably driving the winding reel SW2, and comprises a motor, a motor driving circuit for supplying a current to the motor, a gear for connecting a motor axis and the winding reel SW2, and the like. In the driving device SW3, a motor current is generated by the motor driving circuit based on a motor current signal from the control device SW5, this motor current is supplied to the motor, and a rotation driving force of the motor is transmitted to the winding reel SW2 through the gear to rotatably drive the winding reel SW2.

The pulse generation circuit SW4 is a circuit which supplies a recording pulse current to a plurality of coils C (see FIG. 5B) provided in the servo signal writing head WH based on the pulse control signal from the control device SW5, and is independently provided in each of the plurality of coils C. Specifically, the pulse generation circuit SW4 alternately generates a pulse current having positive polarity or negative polarity and a zero current, based on the pulse control signal from the control device SW5, and accordingly, the servo pattern SP is recorded at a predetermined position of each servo band SB. The recording pulse current is a current value sufficient for magnetizing the magnetic layer of the magnetic tape MT by a leakage flux from a gap pattern G (see FIG. 5B), and is set by considering properties of the coil C of the servo signal writing head WH.

Figure 5B:
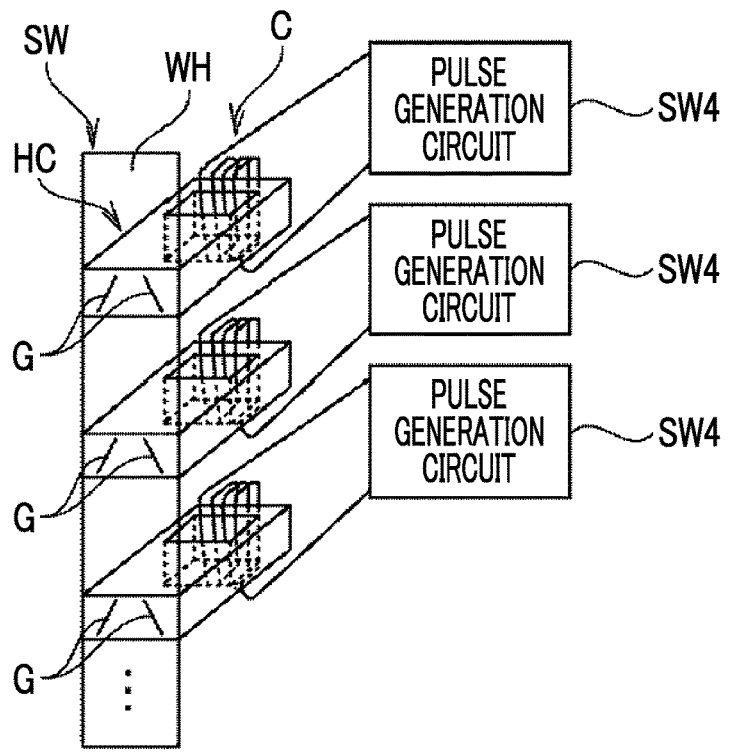
FIG. 5B is another view showing the example of the configuration of the servo writer according to the embodiment.

As shown in FIG. 5B, the servo signal writing head WH includes the linear gap pattern G provided at a position corresponding to each servo band SB, and the servo pattern SP is recorded on the servo band SB of the magnetic tape MT with each gap pattern G. One linear pattern of the gap pattern G is tilted according to the angle of the linear pattern SP1, and the other linear pattern is not parallel to the one linear pattern according to the linear pattern SP2. The gap pattern G is an example of a servo recording element which records the servo pattern SP on the servo band SB.

In addition, a head core HC is independent for each gap pattern G, and each coil C is wound around the head core HC. Each pulse generation circuit SW4 connected to each coil C converts the data for distinguishing each servo band SB encoded in the control device SW5 into a pattern of the recording pulse current, and the recording pulse current is supplied to the coil C according to this pattern. Accordingly, unique identification information corresponding to each servo band SB is embedded in the servo pattern SP of each servo band SB. The head core HC may not be independent for each gap pattern G and, for example, one head core HC may be provided for all of the gap patterns G. In this case, the servo pattern SP is collectively recorded on each servo band SB by one recording pulse current.

Figure 6:
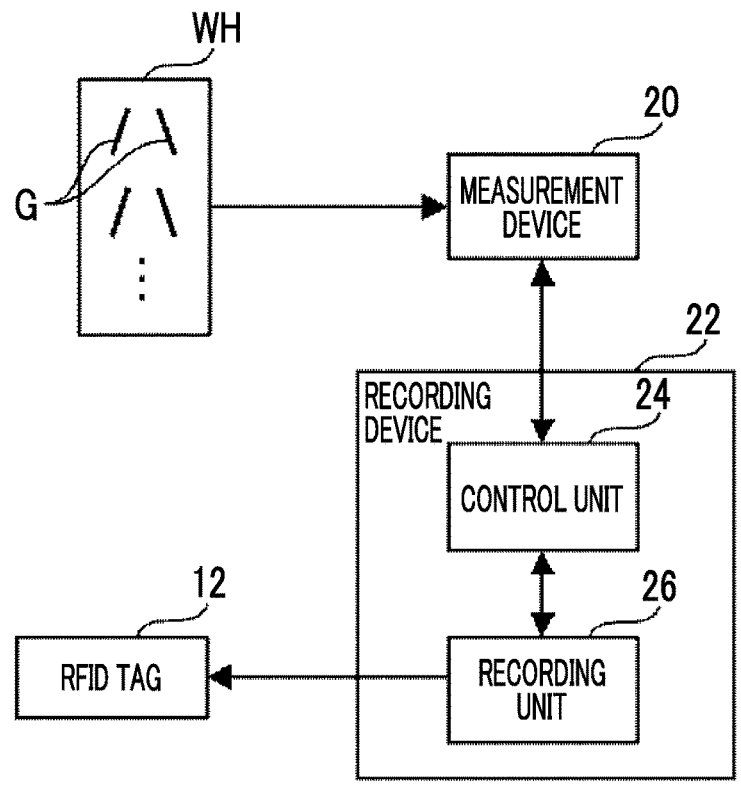
FIG. 6 is a block view showing an example of a configuration of a measurement device and a recording device according to the embodiment.

Next, with reference to FIG. 6, a measurement device 20 and a recording device 22 for recording the servo pattern distance information item 14 and the servo band interval relevant information 16 on the RFID tag 12 of the magnetic tape cartridge 10. Examples of the measurement device 20 include a magnetic force microscope (MFM), a scanning electron microscope (SEM), and a laser microscope. As shown in FIG. 6, the recording device 22 includes a control unit 24 including a central processing unit (CPU) and a memory as a temporary storage, and a recording unit 26 which records information on the RFID tag 12 in a contactless manner.

The measurement device 20 performs measurement regarding the servo signal writing head WH of the servo writer SW and outputs a signal corresponding to a distance between two linear patterns of each gap pattern G in a direction corresponding to the longitudinal direction. In addition, the measurement device 20 outputs a signal corresponding to an interval between adjacent gap patterns G in a direction corresponding to the width direction.

Figure 7:
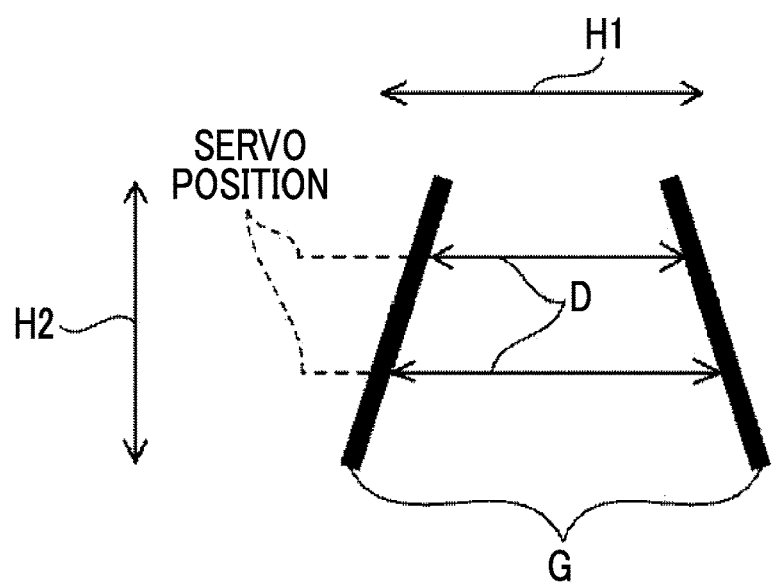
FIG. 7 is a view for describing a distance between linear patterns of a servo pattern according to the embodiment.

The control unit 24 of the recording device 22 obtains a signal output from the measurement device 20. As shown in FIG. 7 as an example, the control unit 24 derives a distance D between two linear patterns of each gap pattern G in a direction H1 corresponding to the longitudinal direction by using the obtained signal. The control unit 24 derives the distance D at each position (hereinafter, referred to as a "servo position") corresponding to the servo pattern SP along a direction H2 corresponding to the width direction. This servo position corresponds to the lapping position described above. The control unit 24 controls the recording unit 26 and records the derived distance D on the RFID tag 12 as the servo pattern distance information 14 by associating with the number and the servo position of the servo band SB corresponding to each gap pattern G.

FIG. 8A shows an example of the servo pattern distance information 14. As shown in FIG. 8A, the distance D corresponding to each of a combination of the number and the servo position of the servo band SB is included in the servo pattern distance information 14. The example shown in FIG. 8A shows the distance D at each servo position, in a case where the servo pattern SP, in which an azimuth angle is 12°, a length in the width direction is 93 μm, and a distance between the linear pattern SP1 and the linear pattern SP2 at a position of a middle point in the width direction (position at 46.5 μm (=93/2)) in the longitudinal direction is 38 μm, is assumed.

From this distance D, which servo position the distance D corresponds to is derived based on Expression (1). The "distance at the middle point" in Expression (1) means a distance between the linear pattern SP1 and the linear pattern SP2 in the longitudinal direction at the position of the middle point of the servo pattern SP in the width direction (in the example of FIG. 8A, 38 μm). That is, in Expression (1), the servo position is derived by the distance in the width direction based on the position of the middle point of the servo pattern SP in the width direction.

$$\text{Servo position} = \frac{\text{Distance at middle point} - \text{Distance } D}{2 \times \tan \text{Azimuth angle}}$$

FIG. 8B shows a distance in the width direction based on the position of the middle point of the servo pattern SP in the width direction derived by Expression (1), regarding each servo position shown in FIG. 8A.

Figures 9, 10:
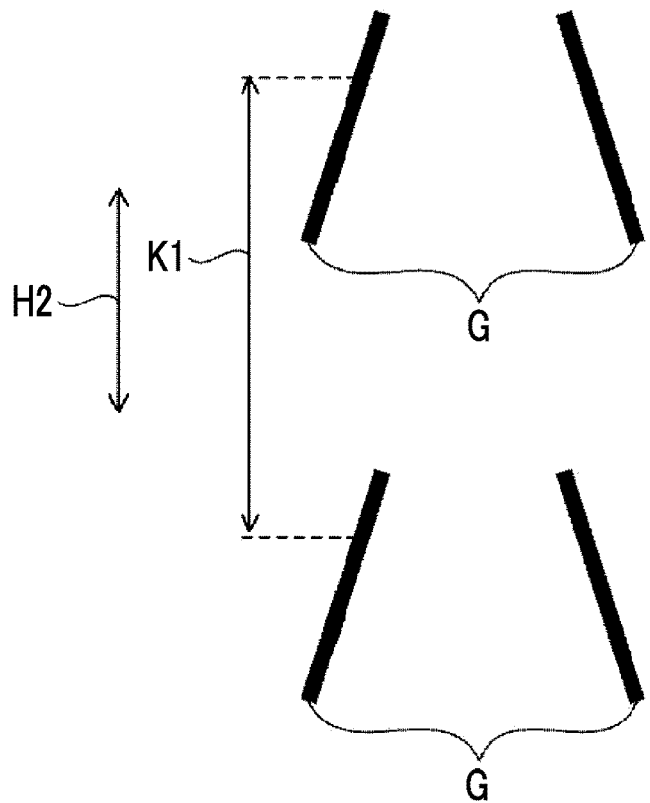
FIG. 9 is a view for describing an interval between gap patterns adjacent to each other according to the embodiment.
FIG. 10 is a view showing an example of servo band interval relevant information according to the embodiment.

As an example shown in FIG. 9, the control unit 24 derives an interval K1 between the servo positions corresponding to adjacent gap patterns G in the direction H2 by using the obtained signal. The control unit 24 derives the interval K1 of each servo position of each combination of adjacent gap patterns G. In addition, the control unit 24 controls the recording unit 26 and records the derived interval K1 which is included in the servo band interval relevant information 16 on the RFID tag 12, by associating with the number of the data band DB between the adjacent gap patterns G and the lapping position corresponding to the servo position.

FIG. 10 shows an example of the servo band interval relevant information 16. As shown in FIG. 10, the servo band interval relevant information 16 includes the interval K1 corresponding to each combination of the number of the data band DB and the lapping position.

Next, an example of a flow of a recording process of recording the servo pattern SP on the magnetic tape MT of the magnetic tape cartridge 10 and recording the servo pattern distance information 14 and the servo band interval relevant information 16 on the RFID tag 12 will be described with reference to FIG. 11.

Figure 11:
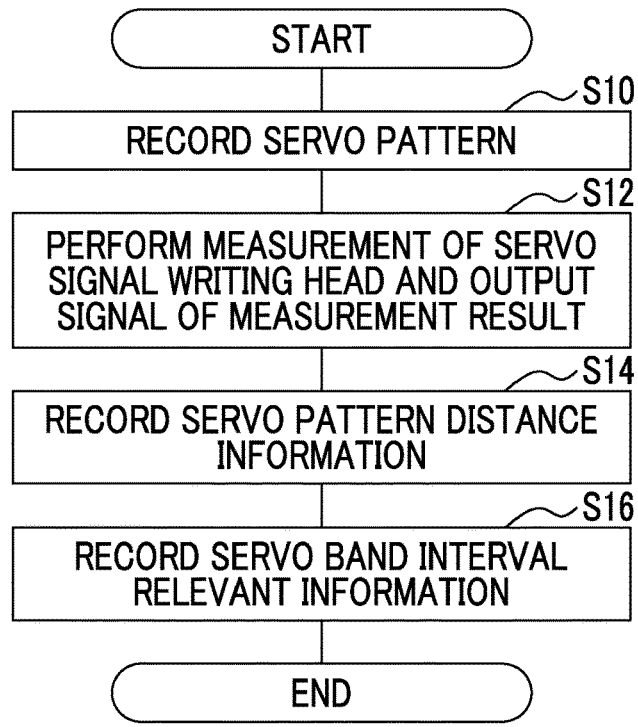
FIG. 11 is a flowchart showing an example of a recording process according to the embodiment.

In a step S10 of FIG. 11, as described above, the servo writer SW records the servo pattern SP by the gap pattern G corresponding to the servo signal writing head WH on each servo band SB of the magnetic tape MT, by the control of the control device SW5.

In a step S12, as described above, the measurement device 20 performs measurement regarding the servo signal writing head WH of the servo writer SW used in the process of the step S10 and outputs a signal of the measurement result. In a step S14, as described above, the control unit 24 of the recording device 22 derives the distance D by using the signal output by the process of the step S12. The control unit 24 controls the recording unit 26 and records the derived distance D on the RFID tag 12 as the servo pattern distance information 14 by associating with the number and the servo position of the servo band SB corresponding to each gap pattern G.

In a step S16, as described above, the control unit 24 of the recording device 22 derives the interval K1 by using the signal output in the process of the step S12. The control unit 24 controls the recording unit 26 and records the derived interval K1 which is included in the servo band interval relevant information 16 on the RFID tag 12, by associating with the number of the data band DB between the adjacent gap patterns G and the lapping position corresponding to the servo position. In a case where the process of the step S16 ends, this recording process ends.

The process procedure of this recording process is not limited to the example shown in FIG. 11. For example, after performing the process from the step S12 to the step S16, the process of the step S10 may be performed. The servo pattern SP is recorded on the servo band SB by the process described above and the magnetic tape cartridge 10 in which the servo pattern distance information 14 and the servo band interval relevant information 16 are recorded on the RFID tag 12 is shipped.

Next, a configuration of a recording and reproducing system 30 which performs recording and reproducing of data with respect to the magnetic tape cartridge 10 will be described with reference to FIG. 12.

Figure 12:
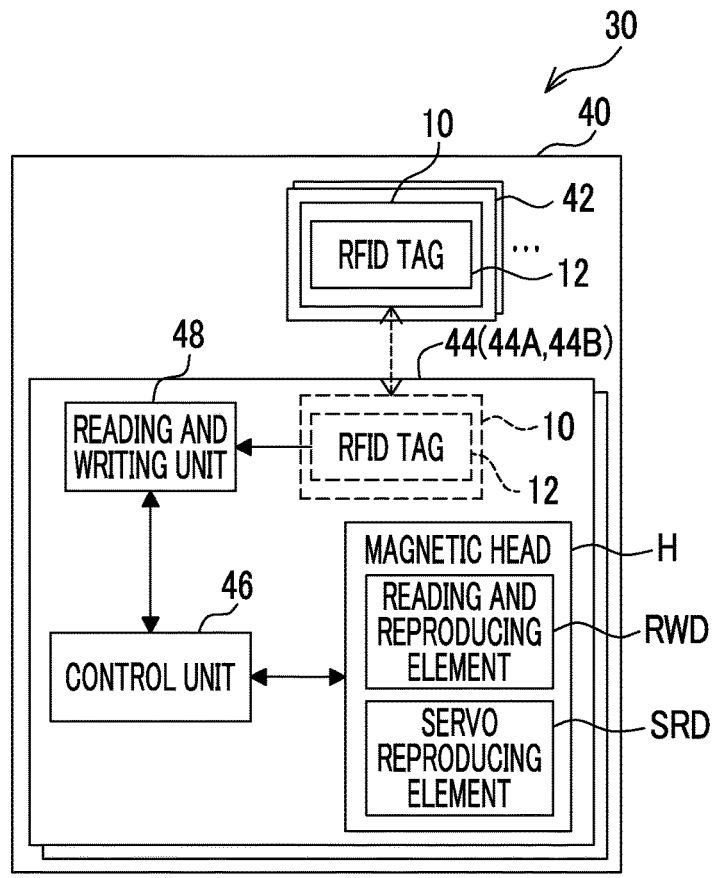
FIG. 12 is a block view showing an example of a configuration of a recording and reproducing system according to the embodiment.

As shown in FIG. 12, the recording and reproducing system 30 includes a tape library 40. The tape library 40 comprises a plurality of slots 42 and a plurality (in the embodiment, two) of tape drives 44. Hereinafter, in a case of distinguishing the two tape drives 44, alphabets are attached to the end of the reference numeral, as a "tape drive 44A" and a "tape drive 44B". In the embodiment, a case of recording data on the magnetic tape cartridge 10 by the tape drive 44A and reproducing the data recorded on the magnetic tape cartridge 10 by the tape drive 44B will be described. The tape drive 44 is an example of a recording and reproducing apparatus.

The magnetic tape cartridge 10 is stored in the slot 42. In the tape drive 44, the magnetic tape cartridge 10 extracted from the slot 42 is loaded. In addition, after completing the recording or reproducing of the data with respect to the magnetic tape MT of the magnetic tape cartridge 10 loaded in the tape drive 44, the magnetic tape cartridge 10 is unloaded from the tape drive 44 and stored in the slot 42.

The tape drive 44 comprises a control unit 46, a reading and writing unit 48, and the magnetic head H. The magnetic head H comprises the plurality of recording and reproducing elements RWD, and the plurality (in the embodiment, two) of servo reproducing elements SRD corresponding to each of the adjacent servo bands SB. The reading and writing unit 48 reads the information recorded on the RFID tag 12 mounted in the magnetic tape cartridge 10 in a contactless manner and outputs the read information to the control unit 46, by the control of the control unit 46. The reading and writing unit 48 records information on the RFID tag 12 in a contactless manner by the control of the control unit 46. As an example of the reading and writing unit 48, an RFID reader and writer is used.

The control unit 46 includes a programmable logic device (PLD), a memory as a temporary storage, and a non-volatile storage unit. In the storage unit of the control unit 46, an interval between the servo reproducing elements SRD, comprised in the tape drive 44 provided with the control unit 46, in a direction corresponding to the width direction is stored. Hereinafter, the interval between the servo reproducing elements SRD of the tape drive 44A is referred to as an "interval h1" and the interval between the servo reproducing elements SRD of the tape drive 44B is referred to as an "interval h2".

Figure 13:
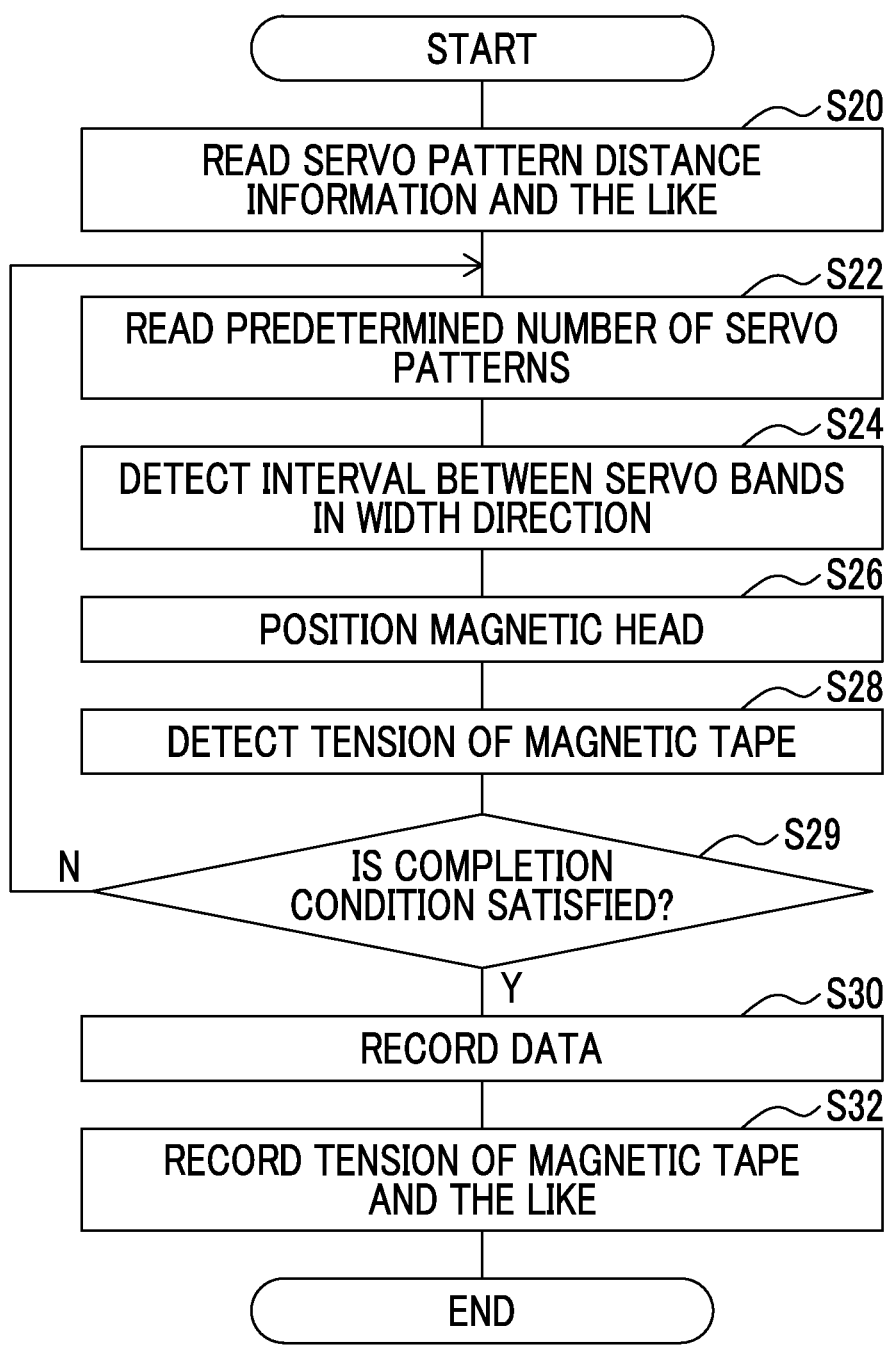
FIG. 13 is a flowchart showing an example of a data recording process according to the embodiment.

Next, a flow of a data recording process of recording data on the magnetic tape cartridge 10 performed by the recording and reproducing system 30 will be described with reference to FIG. 13. The data recording process shown in FIG. 13 is, for example, performed in a case where data which is a recording target is input to the control unit 46 of the tape drive 44A. Here, the data recording process is performed in a state where the magnetic tape cartridge 10 is loaded in the tape drive 44A.

In a step S20 of FIG. 13, the control unit 46 controls the reading and writing unit 48 and causes the reading of the servo pattern distance information 14 and the servo band interval relevant information 16 recorded on the RFID tag 12. Then, the control unit 46 obtains the servo pattern distance information 14 and the servo band interval relevant information 16 read by the reading and writing unit 48. In a step S22, the control unit 46 controls the magnetic head H and causes the servo reproducing element SRD to read the predetermined number of servo patterns SP recorded on the servo band SB. In this case, the control unit 46 controls a transportation mechanism of pulling out the magnetic tape MT so that a tension of the magnetic tape MT becomes a regulated tension (for example, 0.55 [N]).

In a step S24, the control unit 46 detects the interval between the adjacent servo bands SB in the width direction based on the read result of the step S22. Hereinafter, this interval is referred to as an "interval K2". Specifically, the control unit 46 converts a time interval of timings at which the linear pattern SP1 and the linear pattern SP2 are read by each servo reproducing element SRD into a distance between the linear pattern SP1 and the linear pattern SP2 in the longitudinal direction. The control unit 46 derives the servo position of each servo reproducing element SRD based on Expression (1) by using the distance obtained by the conversion. Then, the control unit 46 detects the interval K2 by adding a difference between the derived servo positions of the servo reproducing elements SRD to the interval h1. The control unit 46 functions as a detection unit by the process of the step S24.

In a step S26, the control unit 46 performs the positioning of the magnetic head H based on the time interval of the timings at which the linear pattern SP1 and the linear pattern SP2 are read in the process of the step S22, and the servo pattern distance information 14 obtained in the process of the step S20.

In a step S28, the control unit 46 derives a tension of the magnetic tape MT based on the interval K1 and the interval K2, according to Expression (2). $\text{Tension}_{write}$ in Expression (2) represents a tension of the magnetic tape MT to be derived. $\text{SBP}_{ref}$ in Expression (2) represents the interval K1 corresponding to the lapping position and the data band DB, of the servo band interval relevant information 16 obtained by the process of the step S20, which is positioned by the process of the step S26. $\text{SBP}_{write}$ in Expression (2) represents the interval K2 detected by the process of the step S24. $\alpha$ in Expression (2) represents a modulus of deformation of the magnetic tape MT. $\text{Tension}_{ref}$ in Expression (2) represents a tension of the magnetic tape MT in a case where the servo writer SW records the servo pattern SP on the servo band SB. The control unit 46 functions as a deriving unit by the process of the step S28.

$$\text{Tension}_{write} = \frac{SBP_{write} - SBP_{ref}}{\alpha} + \text{Tension}_{ref} \qquad (2)$$

In a case of recording the data, a deviation amount $\Delta P_{write}$ from an ideal value of the interval K2 of the servo band SB detected by the process of the step S24 is obtained by Expression (3). In the embodiment, as shown in Expression (2), the tension of the magnetic tape MT in a case of recording the data on the data band DB is derived in accordance with a difference between the interval K1 of the gap pattern G of the servo writer SW and the interval K2 of the servo band SB. Accordingly, the deviation amount $\Delta P_{write}$ can be set as a suitable value. h1 in Expression (3) is the interval h1 described above.

$$\Delta P_{write} = SBP_{write} - h_1 - \alpha \times \text{Tension}_{write} \qquad (3)$$

For example, the modulus of deformation of the magnetic tape MT in Expressions (2) and (3) is derived as a deformation amount of the magnetic tape MT in a width direction with respect to 1[N] per the interval 2.858 [mm] of the adjacent servo bands SB by Expression (4) $\varepsilon_{MD}$ in Expression (4) represents a distortion of the magnetic tape MT in a longitudinal direction, $\sigma$ represents a stress, and $E_{MD}$ represents a Young's modulus of the magnetic tape MT in a longitudinal direction v in Expression (4) represents a Poisson's ratio and d represents a unit distance (in the embodiment, 2.858 [mm]). The stress is obtained by using a cross-sectional area obtained from a total thickness and width of the magnetic tape MT. The Young's modulus of the magnetic tape MT in a longitudinal direction and the tape total thickness vary depending on a material of the magnetic tape MT such as polyaramide (PA), polyethylene terephthalate (PET), and polyethylene naphthalate (PEN), and are determined according to the material thereof.

$$\varepsilon_{MD} = \frac{\sigma}{E_{MD}}, \alpha = v \times \varepsilon_{MD} \times d \qquad (4)$$

In a step S29, the control unit 46 determines whether or not the predetermined completion condition is satisfied. In a case where the determination is denied, the process returns to the step S22, and in a case where the determination is affirmative, the process moves to a step S30. As the completion condition in this case, for example, the condition in which the tension derived by the process of the step S28 is converged is used. In addition, as the completion condition in this case, for example, the condition in which all servo patterns SP recorded on the servo band SB are read, and the condition in which the predetermined number of servo patterns SP are read are used.

In the step S30, the control unit 46 controls the magnetic head H and records data on the data band DB. In this case, the control unit 46 controls a transportation mechanism of pulling the magnetic tape MT so that the tension of the magnetic tape MT becomes a tension derived by the process of the step S28. In a step S32, the control unit 46 controls the reading and writing unit 48 and records the servo band interval relevant information 16, to which the tension derived by the process of the step S28, and the interval K2 and the interval h1 detected by the process of the step S24 are added, on the RFID tag 12. In this case, the control unit 46 adds the tension of the magnetic tape MT, the interval K2, and the interval h1 to the servo band interval relevant information 16 by associating with the number of the data band DB on which the data is recorded and the lapping position. In a case where the process of the step S32 ends, the magnetic tape cartridge 10 is unloaded from the tape drive 44A and the unloaded magnetic tape cartridge 10 is stored in the slot 42. In a case where the process of the step S32 ends, the data recording process ends.

Figures 14, 15:
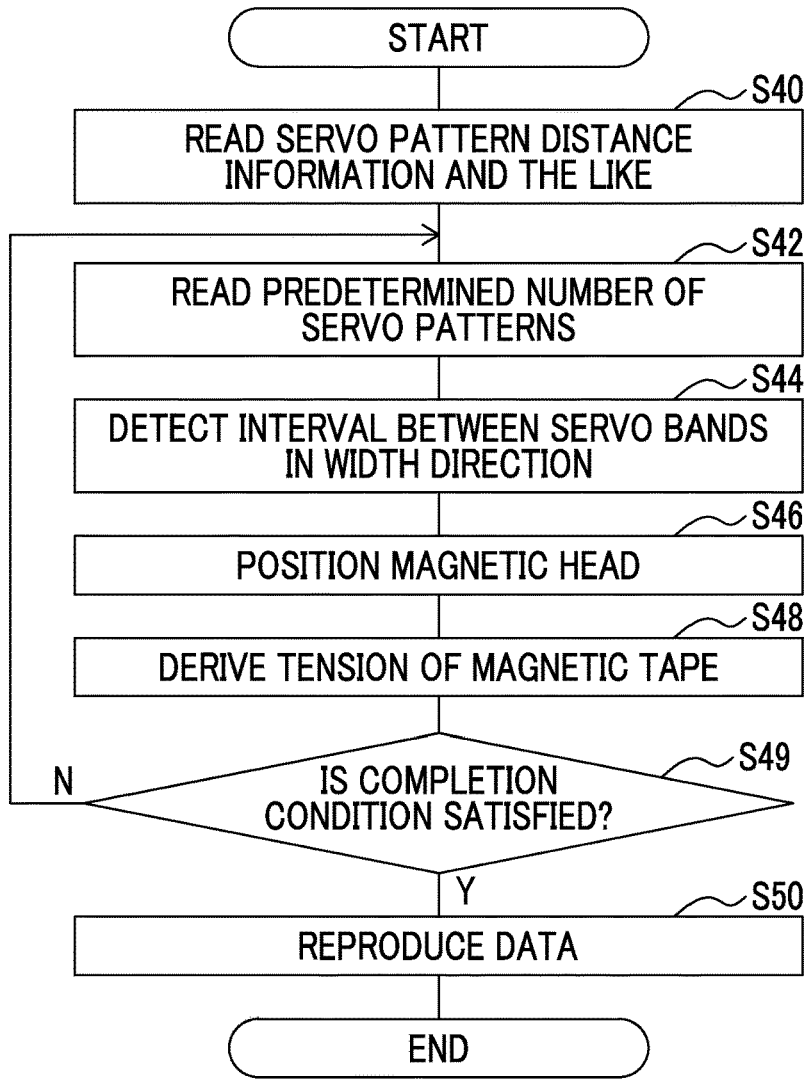
FIG. 14 is a view showing an example of the servo band interval relevant information according to the embodiment.
FIG. 15 is a flowchart showing an example of a data reproducing process according to the embodiment.

By the process of the step S32, as an example shown in FIG. 14, the tension of the magnetic tape MT during the data recording, the interval K2 detected during the data recording, and the interval h1 of the servo reproducing element SRD of the tape drive 44A on which the data is added, to the servo band interval relevant information 16.

Next, a flow of the data reproducing process in which the recording and reproducing system 30 reproduces the data recorded on the magnetic tape cartridge 10 will be described with reference to FIG. 15. The data reproducing process shown in FIG. 15 is, for example, performed, in a case where a reproducing instruction of the data is input to the control unit 46 of the tape drive 44B. Here, the data reproducing process is performed in a state where the magnetic tape cartridge 10 is loaded on the tape drive 44B.

In a step S40 of FIG. 15, the control unit 46 controls the reading and writing unit 48 and causes the reading of the servo pattern distance information 14 and the servo band interval relevant information 16 recorded on the RFID tag 12. The control unit 46 obtains the servo pattern distance information 14 and the servo band interval relevant information 16 read by the reading and writing unit 48. In a step S42, the control unit 46 controls the magnetic head H and causes the servo reproducing element SRD to read the predetermined number of servo patterns SP recorded on the servo band SB. In this case, the control unit 46 controls a transportation mechanism of pulling the magnetic tape MT so that the tension of the magnetic tape MT becomes regulated tension.

In a step S44, the control unit 46 detects the interval K2 between the adjacent servo bands SB in the width direction based on the read result of the step S42, in the same manner as in the step S24. In a step S46, the control unit 46 performs the positioning of the magnetic head H based on the time interval of timings at which the linear pattern SP1 and the linear pattern SP2 are read by the process of the step S42, and the servo pattern distance information 14 obtained by the process of the step S40.

In a step S48, the control unit 46 derives the tension of the magnetic tape MT based on the interval K2, the interval h1, and the tension of the magnetic tape MT during the data recording included in the servo band interval relevant information 16, the interval h2 and the interval K2 detected by the process of the step S44 stored in a storage unit. A deviation amount $\Delta P_{read}$ from the ideal value of the interval K2 detected by the process of the step S44 is represented by Expression (5).

$$\Delta P_{read} = SBP_{read} - h_2 - \alpha \times \text{Tension}_{read} \quad (5)$$

By minimizing a difference between the deviation amount $\Delta P_{write}$ during the data recording and the deviation amount $\Delta P_{read}$ during the data reproducing (in the embodiment, equalizing the deviation amount $\Delta P_{write}$ during the data recording and the deviation amount $\Delta P_{read}$ during the data reproducing), data of the suitable data track DT is reproduced by the recording and reproducing element RWD. Therefore, in the embodiment, the control unit 46 derives the tension of the magnetic tape MT based on Expression (6) obtained from Expressions (3) and (5). $\text{Tension}_{read}$ in Expression (6) represents the tension of the magnetic tape MT to be derived. $\text{Tension}_{write}$ in Expression (6) represents the tension of the magnetic tape MT during the data recording included in the servo band interval relevant information 16. $SBP_{write}$ in Expression (6) represents the interval K2 included in the servo band interval relevant information 16. $SBP_{read}$ in Expression (6) represents the interval K2 detected by the process of the step S44. h1 in Expression (6) represents the interval h1 included in the servo band interval relevant information 16 and h2 represents the interval h2 stored in the storage unit. $\alpha$ in Expression (6) represents a modulus of deformation of the magnetic tape MT described above.

$$\text{Tension}_{read} = \frac{SBP_{write} - SBP_{read}}{\alpha} - \frac{h_1 - h_2}{\alpha} + \text{Tension}_{write} \quad (6)$$

In a step S49, the control unit 46 determines whether or not the predetermined completion condition is satisfied, in the same manner as in the step S29. In a case where the determination is denied, the process returns to the step S42, and in a case where the determination is affirmative, the process moves to a step S50.

In the step S50, the control unit 46 controls the magnetic head H and reproduces the data recorded on the data band DB. In this case, the control unit 46 controls a transportation mechanism of pulling the magnetic tape MT so that the tension of the magnetic tape MT becomes a tension derived by the process of the step S48. In a case where the process of the step S50 ends, the magnetic tape cartridge 10 is unloaded from the tape drive 44B and the unloaded magnetic tape cartridge 10 is stored in the slot 42. In a case where the process of the step S50 ends, this data reproducing process ends.

Figure 16:
FIG. 16 is a view showing an example of an ideal servo pattern and an actual servo pattern.
Figure 16:
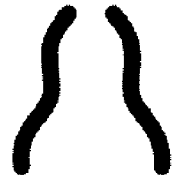
Figure 16:
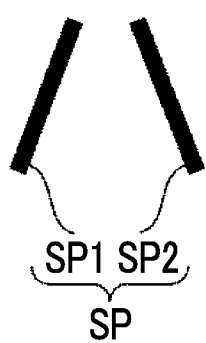
Figure 16:
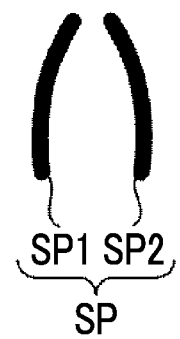

As described above, in the embodiment, the interval K1 of the adjacent gap patterns G in the direction H2 corresponding to the width direction of the magnetic tape MT is recorded on the servo band interval relevant information 16 recorded on the RFID tag 12. As an example shown in FIG. 16, it is ideal for the servo patterns SP to be linearly recorded, but in practice, the servo patterns SP are recorded in a curved manner, in many cases. With respect to this, in the embodiment, by controlling the tension of the magnetic tape MT by using the interval K1 during the data recording, it is possible to perform the positioning of the magnetic head H with an excellent accuracy.

According to the embodiment, in a case of reproducing the data, the control of setting the tension of the magnetic tape MT as the tension which minimizes a difference between the deviation amount $\Delta P_{write}$ during the data recording and the deviation amount $\Delta P_{read}$ during the data reproducing is performed. Therefore, even in a case where the magnetic tape MT id deformed in the width direction due to time elapse, heat, and the like, it is possible to perform the positioning of the magnetic head H with an excellent accuracy.

In the embodiment, a case of recording the servo band interval relevant information 16 on the RFID tag 12 has been described, but there is no limitation thereto. For example, the servo band interval relevant information 16 may be repeatedly recorded on a top portion or over the entire length of the data band DB or the servo band SB. In addition, the servo band interval relevant information 16 may be recorded on a barcode recorded at a predetermined position of an outer peripheral surface of the magnetic tape cartridge 10. Further, the servo band interval relevant information 16 may be recorded on a two-dimensional code such as a QR code (registered trademark) recorded at a predetermined position of an outer peripheral surface of the magnetic tape cartridge 10.

In the embodiment, the servo band interval relevant information 16 may be recorded on a database of the outside. In this case, for example, identification information such as a manufacturing number of the magnetic tape cartridge 10 may be recorded on the RFID tag 12, the barcode, or the two-dimensional code, and the servo band interval relevant information 16 may be recorded on the database by associating with the identification information of the magnetic tape cartridge 10.

In the embodiment, various information items included in the servo band interval relevant information 16 may be included in the servo band interval relevant information 16 at each different position of the magnetic tape MT in the longitudinal direction.

Explanation of References

What is claimed is:

1. A magnetic tape cartridge comprising:
    a magnetic tape including a plurality of servo bands on which servo patterns are recorded, and a data band that is provided between the servo bands and on which data is recorded; and
    a recording medium on which servo band interval relevant information is recorded, the servo band interval relevant information including an interval of adjacent servo recording elements of a plurality of servo recording elements in a direction corresponding to a width direction of the magnetic tape, wherein each of the plurality of servo recording elements records the servo pattern on each of the plurality of servo bands, wherein the servo band interval relevant information further includes a tension of the magnetic tape, in a case of recording data on the data band, an interval of servo reproducing elements of a tape drive which reproduce the adjacent servo patterns in a direction corresponding to the width direction, in a case of recording the data on the data band, and an interval between the adjacent servo bands in the width direction detected, in a case of recording the data on the data band.

2. The magnetic tape cartridge according to claim 1, wherein the servo band interval relevant information is recorded on the recording medium on each of a plurality of different positions of the servo pattern along the width direction.

3. The magnetic tape cartridge according to claim 1, wherein the servo band interval relevant information is recorded on the recording medium on each of a plurality of different positions of the servo pattern along the width direction.

4. A manufacturing method of a magnetic tape cartridge including a magnetic tape including a plurality of servo bands on which servo patterns are recorded, and a data band which is provided between the servo bands and on which data is recorded, and a recording medium, the method comprising:

recording servo band interval relevant information on the recording medium, the servo band interval relevant information including an interval of adjacent servo recording elements of a plurality of servo recording elements in a direction corresponding to a width direction of the magnetic tape, each of the plurality of servo recording elements records the servo pattern on each of the plurality of servo bands, wherein the servo band interval relevant information further includes a tension of the magnetic tape, in a case of recording data on the data band, an interval of servo reproducing elements of a tape drive which reproduce the adjacent servo patterns in a direction corresponding to the width direction, in a case of recording the data on the data band, and an interval between the adjacent servo bands in the width direction detected, in a case of recording the data on the data band.

5. A manufacturing device of a magnetic tape cartridge including a magnetic tape including a plurality of servo bands on which servo patterns are recorded, and a data band that is provided between the servo bands and on which data is recorded, and a recording medium, the device comprising:

a recording unit that records servo band interval relevant information on the recording medium, the servo band interval relevant information including an interval of adjacent servo recording elements of a plurality of servo recording elements in a direction corresponding to a width direction of the magnetic tape, each of the plurality of servo recording elements records the servo pattern on each of the plurality of servo bands, wherein the servo band interval relevant information further includes a tension of the magnetic tape, in a case of recording data on the data band, an interval of servo reproducing elements of a tape drive which reproduce the adjacent servo patterns in a direction corresponding to the width direction, in a case of recording the data on the data band, and an interval between the adjacent servo bands in the width direction detected, in a case of recording the data on the data band.

6. A recording and reproducing apparatus of a magnetic tape cartridge including a magnetic tape including a plurality of servo bands on which servo patterns are recorded, and a data band that is provided between the servo bands and on which data is recorded, and a recording medium on which servo band interval relevant information is recorded, the servo band interval relevant information including an interval of adjacent servo recording elements of a plurality of servo recording elements in a direction corresponding to a width direction of the magnetic tape, each of the plurality of servo recording elements records the servo pattern on each of the plurality of servo bands, the recording and reproducing apparatus comprising:

a magnetic head that includes a servo reproducing element which reads a servo pattern recorded on a servo band, and a recording and reproducing element that performs recording and reproducing of data with respect to the data band;

a detection unit that detects the interval of the adjacent servo bands in the width direction from a read result of the servo pattern by the servo reproducing element;

a deriving unit that derives a tension of the magnetic tape in accordance with a difference between an interval of the servo recording elements in a direction corresponding to the width direction of the magnetic tape included in the servo band interval relevant information and the interval detected by the detection unit; and a control unit that controls the tension of the magnetic tape to be the tension derived by the deriving unit, in a case of recording data on the data band by the recording and reproducing element.

7. The recording and reproducing apparatus according to claim 6, wherein the control unit performs a control of recording the servo band interval relevant information on the recording medium by adding the tension derived by the deriving unit, the interval of the adjacent servo reproducing elements in the direction corresponding to the width direction, and the interval detected by the detection unit to the servo band interval relevant information.

8. A recording and reproducing apparatus of a magnetic tape cartridge including a magnetic tape including a plurality of servo bands on which servo patterns are recorded, and a data band that is provided between the servo bands and on which data is recorded, and a recording medium, on which servo band interval relevant information is recorded, the servo band interval relevant information including an interval of adjacent servo bands in a width direction of the magnetic tape detected in a case of recording data on the data band, a tension of the magnetic tape in a case of recording data on the data band, and an interval of the adjacent servo reproducing elements in a direction corresponding to the width direction, the recording and reproducing apparatus comprising:

a magnetic head that includes a servo reproducing element which reads a servo pattern recorded on a servo band, and a recording and reproducing element that performs recording and reproducing of data with respect to the data band;

a detection unit that detects the interval of the adjacent servo bands in the width direction from a read result of the servo pattern by the servo reproducing element;

a deriving unit that derives a tension of the magnetic tape for minimizing a difference between a deviation amount from an ideal value of an interval of the servo bands in the width direction obtained from the interval between the adjacent servo bands in the width direction, the tension, and the interval between the adjacent servo reproducing elements in a direction corresponding to the width direction included in the servo band interval relevant information, and a deviation amount obtained from the interval detected by the detection unit, the interval between the adjacent servo reproducing elements in a direction corresponding to the width direction included in the magnetic head, and the tension of the magnetic tape in a case of reproducing data recorded on the data band by the recording and reproducing element; and a control unit that controls the tension of the magnetic tape to be the tension derived by the deriving unit, in a case of reproducing data recorded on the data band by the recording and reproducing element.

9. A control method of a tension of a magnetic tape performed by a recording and reproducing apparatus, the recording and reproducing apparatus including a magnetic head, the magnetic head including a servo reproducing element that reads a servo pattern recorded on a servo band of a magnetic tape cartridge, and a recording and reproducing element that performs recording and reproducing of data with respect to a data band of the magnetic tape cartridge, the magnetic tape cartridge including a magnetic tape including a plurality of servo bands on which servo patterns are recorded, and the data band that is provided between the servo bands and on which data is recorded, and a recording medium on which servo band interval relevant information is recorded, the servo band interval relevant information including an interval of adjacent servo recording elements of a plurality of servo recording elements in a direction corresponding to a width direction of the magnetic tape, each of the plurality of servo recording elements records the servo pattern on each of the plurality of servo bands, the method comprising:

detecting an interval between the adjacent servo bands in the width direction from a read result of the servo pattern by the servo reproducing element;

deriving a tension of the magnetic tape in accordance with a difference between an interval of the servo recording elements in a direction corresponding to the width direction of the magnetic tape included in the servo band interval relevant information and the detected interval; and controlling the tension of the magnetic tape to be the derived tension, in a case of recording data on the data band by the recording and reproducing element.

10. A control method of a tension of a magnetic tape performed by a recording and reproducing apparatus, the recording and reproducing apparatus including a magnetic head, the magnetic head including a servo reproducing element that reads a servo pattern recorded on a servo band of a magnetic tape cartridge, and a recording and reproducing element which performs recording and reproducing of data with respect to a data band of the magnetic tape cartridge, the magnetic tape cartridge including a magnetic tape including a plurality of servo bands on which servo patterns are recorded, and the data band that is provided between the servo bands and on which data is recorded, and a recording medium, on which servo band interval relevant information is recorded, the servo band interval relevant information including an interval of adjacent servo bands in a width direction of the magnetic tape detected in a case of recording data on the data band, a tension of the magnetic tape in a case of recording data on the data band, and an interval of the adjacent servo reproducing elements in a direction corresponding to the width direction, the method comprising;

detecting the interval of the adjacent servo bands in the width direction from a read result of the servo pattern by the servo reproducing element;

deriving a tension of the magnetic tape for minimizing a difference between a deviation amount from an ideal value of an interval of the servo bands in the width direction obtained from the interval between the adjacent servo bands in the width direction, the tension, and the interval between the adjacent servo reproducing elements in a direction corresponding to the width direction included in the servo band interval relevant information, and a deviation amount obtained from the detected interval, the interval between the adjacent servo reproducing elements in a direction corresponding to the width direction included in the magnetic head, and the tension of the magnetic tape in a case of reproducing data recorded on the data band by the recording and reproducing element; and controlling the tension of the magnetic tape to be the derived tension, in a case of reproducing data recorded on the data band by the recording and reproducing element.

* * * * *